(12) United States Patent
Kojo

(10) Patent No.: US 7,242,385 B2
(45) Date of Patent: Jul. 10, 2007

(54) INFORMATION PROCESSING DEVICE AND KEY BUTTON FUNCTION ALLOCATING METHOD USED THEREFOR

(75) Inventor: Akihiro Kojo, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 623 days.

(21) Appl. No.: 10/700,683

(22) Filed: Nov. 5, 2003

(65) Prior Publication Data

US 2004/0140967 A1 Jul. 22, 2004

(30) Foreign Application Priority Data

Nov. 6, 2002 (JP) ............................. 2002-322091

(51) Int. Cl.
*G09G 5/00* (2006.01)
(52) U.S. Cl. ...................... 345/156; 361/680
(58) Field of Classification Search ............... 345/156, 345/157, 158, 159, 160, 161, 167, 168, 169, 345/170; 361/680, 681, 686
See application file for complete search history.

(56) References Cited

U.S. PATENT DOCUMENTS 5,041,819 A * 8/1991 Takeda .................... 345/160
5,268,817 A * 12/1993 Miyagawa et al. ......... 361/681

FOREIGN PATENT DOCUMENTS

JP 2892148 2/1999

* cited by examiner

*Primary Examiner*—Richard Hjerpe
*Assistant Examiner*—Jean Lesperance
(74) *Attorney, Agent, or Firm*—Finnegan, Henderson, Farabow, Garrett & Dunner, L.L.P.

(57) ABSTRACT

An information processing device includes a main body, a display unit pivotally coupled between a first position and a second position, the display unit having a buttons arranged on an outer surface of the display unit, a detector detecting whether the display unit is in a first position or in a second position, and a unit which changes the functions of the plurality of key buttons according to a detection result of the detector.

6 Claims, 9 Drawing Sheets

FIG. 6
| Rotation state | Open/shut state | Mode |
|---|---|---|
| 0° | OPEN | Note mode |
| 0° | CLOSE | Note mode |
| 180° | OPEN | Note mode |
| 180° | CLOSE | Tablet mode |
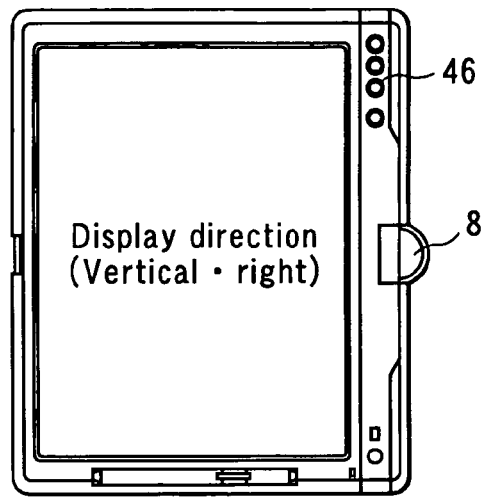
FIG. 7A
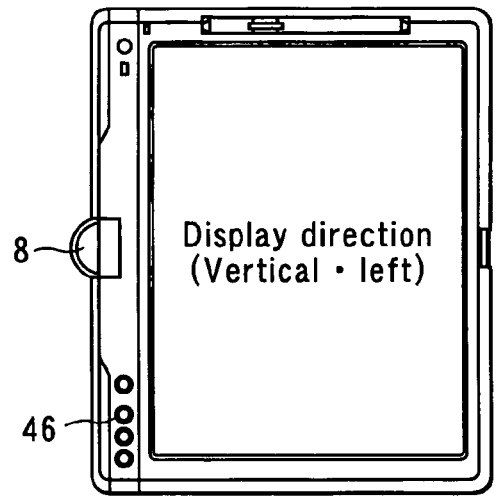
FIG. 7B
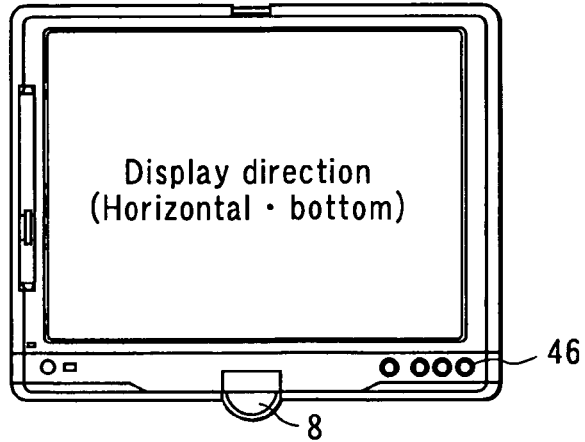
FIG. 7C
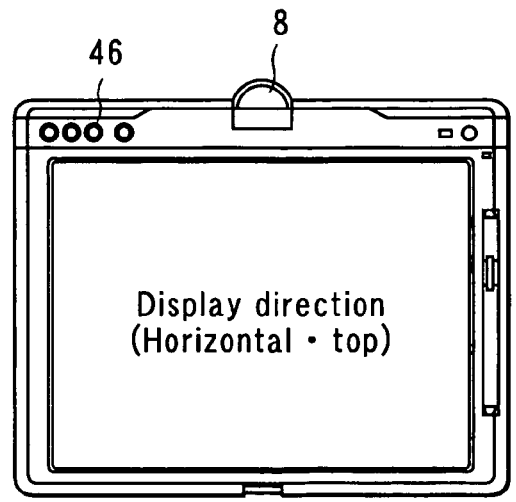
FIG. 7D

| | | Note mode | | Tablet mode | | | | | | | |
|---|---|---|---|---|---|---|---|---|---|---|---|
| | | | | Vertical · right | | Vertical · left | | Horizontal · top | | Horizontal · bottom | |
| | | At boot | After OS starts | At boot | After OS starts | At boot | After OS starts | At boot | After OS starts | At boot | After OS starts |
| Extension key 46a | | Invalidity | Reset (Ctrl+Alt+DEl) | Setup screen display | Reset (Ctrl+Alt+DEl) | Setup screen display | Reset (Ctrl+Alt+DEl) | Setup screen display | Reset (Ctrl+Alt+DEl) | Setup screen display | Reset (Ctrl+Alt+DEl) |
| Extension key 46a | | Invalidity | ← | ↑ | ↑ | ↓ | ↓ | ← | ← | → | → |
| Extension key 46a | | Invalidity | Menu screen display/Enter | Boot selection screen display/Enter | Menu screen display/Enter | Boot selection screen display/Enter | Menu screen display/Enter | Boot selection screen display/Enter | Menu screen display/Enter | Boot selection screen display/Enter | Menu screen display/Enter |
| Extension key 46a | | Invalidity | → | ↓ | ↓ | ↑ | ↑ | → | → | ← | ← |

FIG.8

INFORMATION PROCESSING DEVICE AND KEY BUTTON FUNCTION ALLOCATING METHOD USED THEREFOR

CROSS-REFERENCE TO RELATED APPLICATIONS

This application is based upon and claims the benefit of priority from the prior Japanese Patent Application No. 2002-322091, filed Nov. 6, 2002, the entire contents of which are incorporated herein by reference.

BACKGROUND OF THE INVENTION

1. Field of the Invention

The present invention relates to an information processing device which allows a user to input by pen operation, particularly to an input button allocation changing method in a portable personal computer whose display panel is rotatable.

2. Description of the Related Art

A notebook type personal computer (hereinafter, referred to as notebook computer) has a keyboard typically accommodated in a main body, and a display unit coupled to the main body via a rotation hinge mechanism. In recent years, there is present one type of such a notebook computer which can be operated through pen input.

The notebook computer which allows pen input has a structure where a tablet is accumulated on the display unit and a user contacts a pen on the tablet while viewing the contents displayed on the display panel using a coordinate detection mechanism of the tablet to allow input operation by a pen.

Since there has been a problem that, when an operation mainly by pen input is implemented in such a notebook computer which allows pen input (hereinafter, referred to as tablet mode), the keyboard on a main body side may interfere with the user operation, a mechanism for facilitating the operation at the time of the pen input operation has been conventionally considered.

For example, the Paten Application No. 2892148 (FIG. 1 and FIG. 5) discloses a notebook computer where, when a display unit is shut, the display unit is rotated by 180° so that a screen of the display panel is exposed. When such a configuration is employed, a user is allowed to input while viewing the display panel even in a state where the display unit is shut, thereby improving portability.

BRIEF SUMMARY OF THE INVENTION

An information processing device according to a first aspect of the present invention is characterized by comprising: a main body; a display unit pivotally coupled between a first position and a second position, the display unit having a f button arranged on an outer surface of the display unit; a detector detecting whether the display unit is in a first position or in a second position; and means for changing the functions of the button according to a detection result of the detector.

A key button function allocating method of an information processing device, which comprises a main body, and a display unit pivotally coupled between a first position and a second position, the display unit having a buttons arranged on an outer surface of the display unit, comprising: detecting whether the display unit is in a first position or in a second position; and changing the functions of the plurality of key buttons according to a detected position.

BRIEF DESCRIPTION OF THE SEVERAL VIEWS OF THE DRAWING

FIG. 6 is a diagram showing a relationship between a rotation state of the display unit and an operation mode in the notebook computer according to the embodiment;

FIGS. 7A to 7D are diagrams for explaining display directions when used in the tablet mode and display contents thereof according to the embodiment;

FIG. 8 is a diagram for explaining a relationship between a utilization state of the notebook computer and a function of each extension key according to the embodiment;

DETAILED DESCRIPTION OF THE INVENTION

Hereinafter, one embodiment according to the present invention will be described with reference to the accompanying drawings.

Figure 1A:
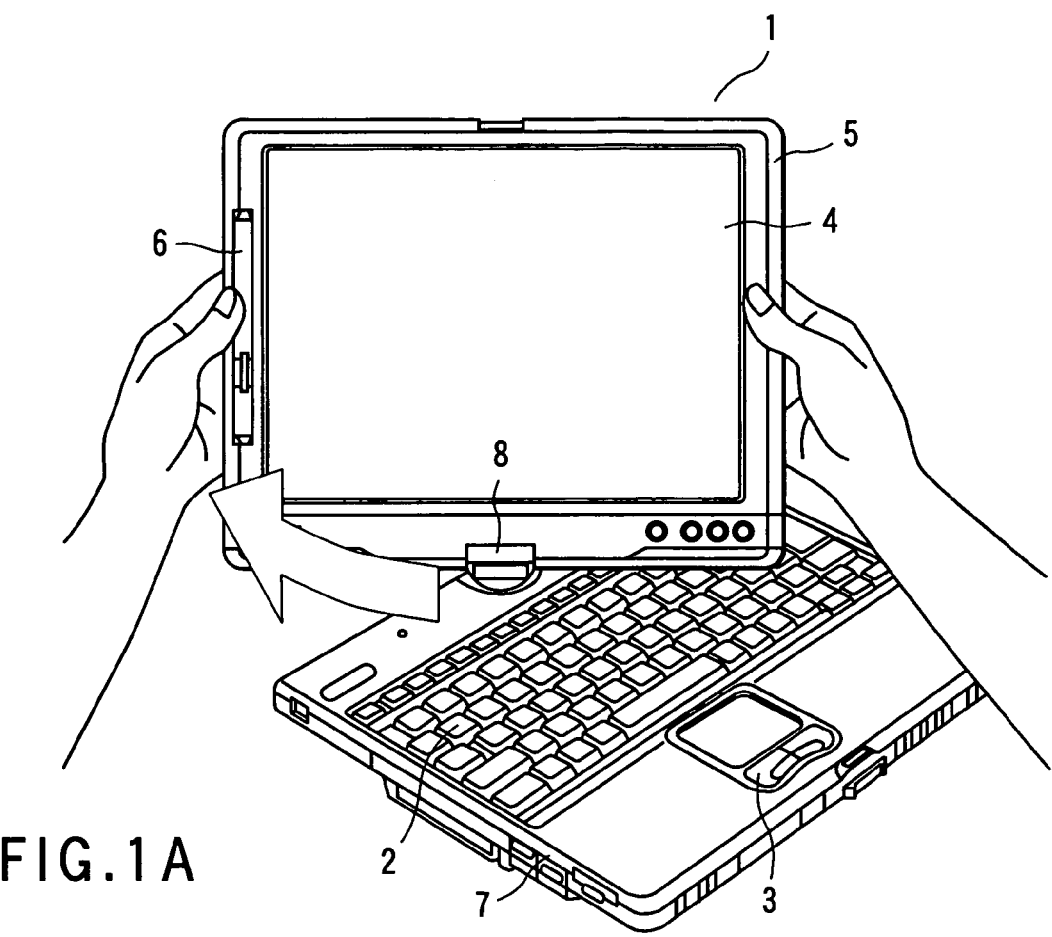
FIGS. 1A and 1B are perspective views showing a utilization form of a notebook computer according to one embodiment of the present invention.
Figure 1B:
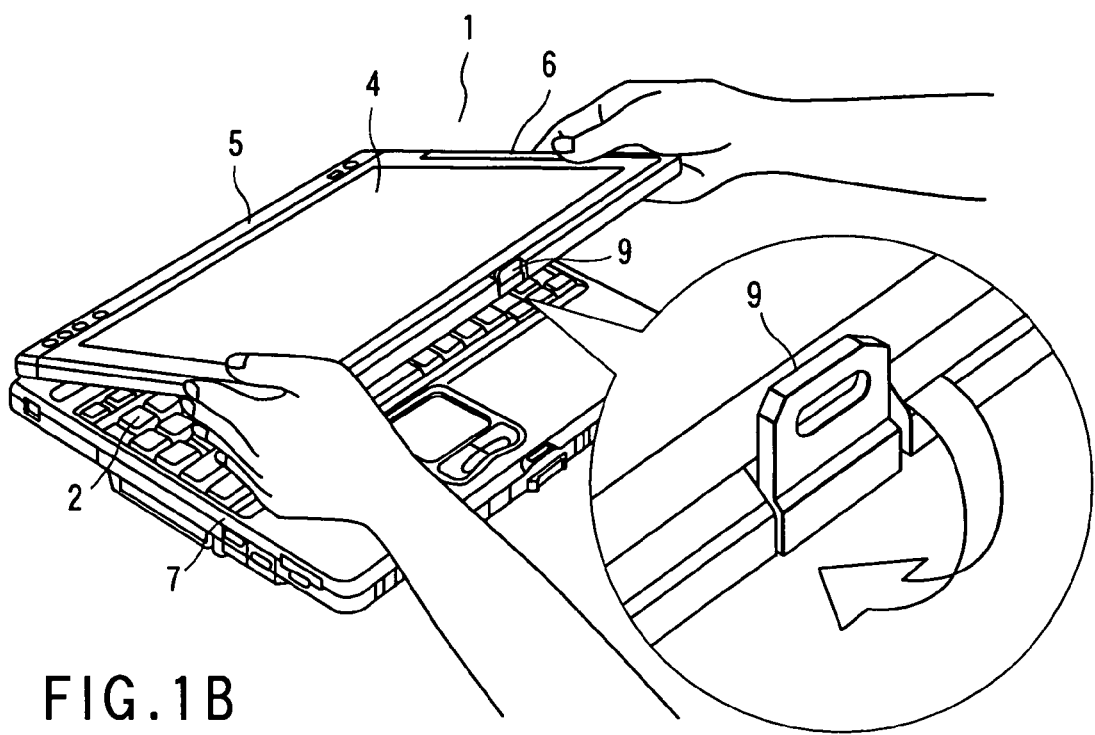

FIGS. 1A and 1B are perspective views for explaining a utilization state of a notebook computer according to one embodiment of the present invention.

A notebook computer 1 according to the present embodiment is operated through a keyboard 2 and a touch pad 3 as a typical notebook computer, and further employs a configuration where a display unit 5 on which a display panel 4 is provided is rotated by 180° and is outwardly folded to be operated by an accompanying tablet pen 6. There is configured so that a main body 7 on which the keyboard 2 and the touch panel 3 are provided and the display unit 5 on which the display panel 4 is provided are rotatably connected to each other through a hinge 8 in order to rotate the display unit 5 by 180°. The hinge 8 according to the present embodiment is configured so that the display unit 5 can be rotated counterclockwise from 0° to 180° and can be turned over as shown in FIG. 1A. Further, the display unit 5 is shut to the main body side with the hinge 8 rotated by 180° so as to be folded as shown in FIG. 1B. A latch 9 arranged at the end of the display unit 5 is inserted into the main body 7 side in the folded state so that the display unit 5 and the main body 7 are fixed to each other.

Figure 2:
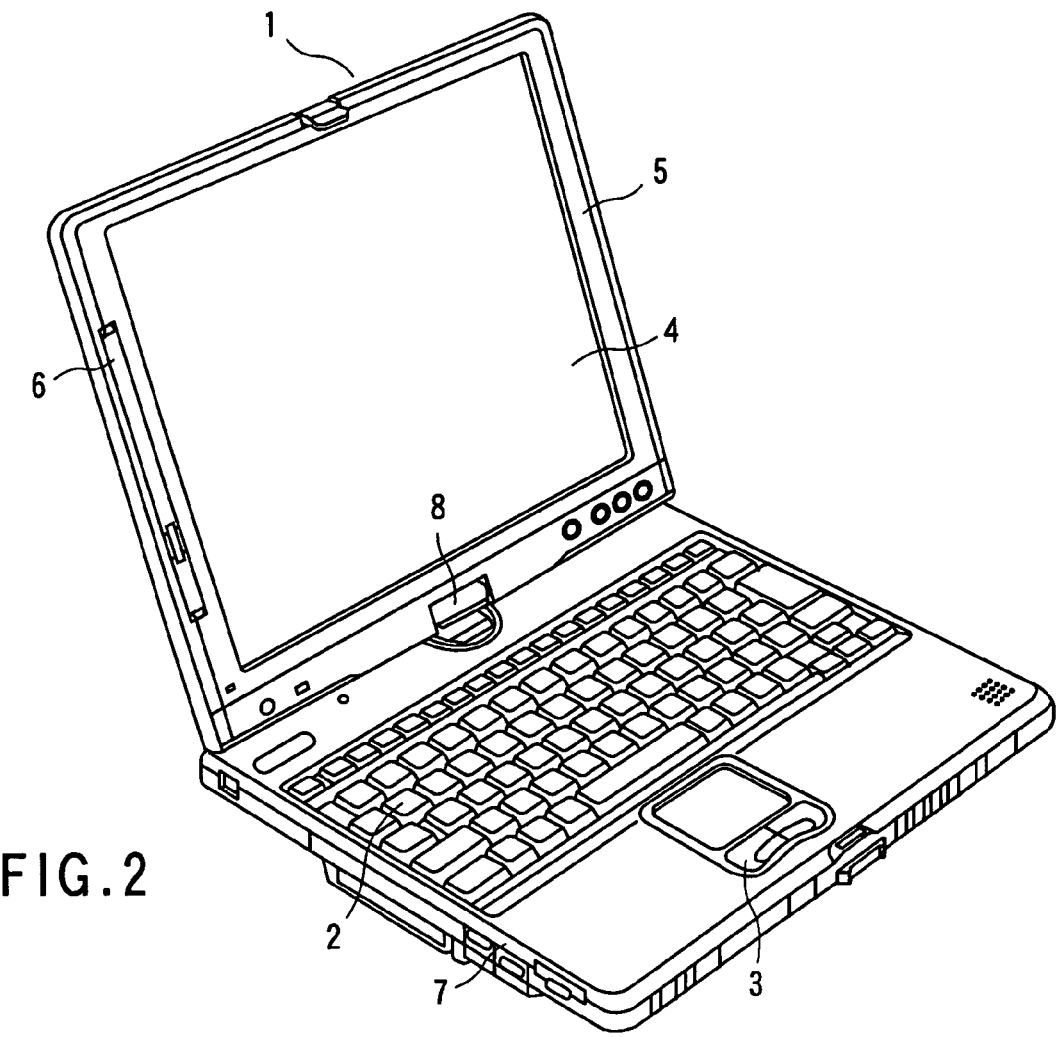
FIG. 2 is a perspective view showing a state where the notebook computer according to the embodiment is used in a note mode.
Figure 3:
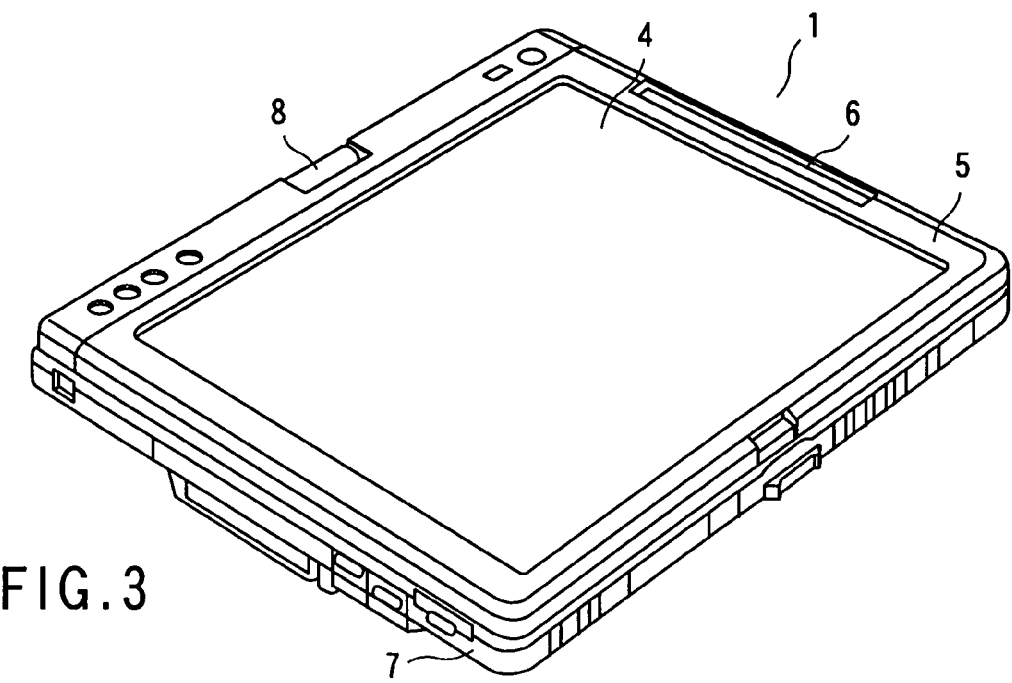
FIG. 3 is a perspective view showing a state where the notebook computer according to the embodiment is used in a tablet mode.
Figure 4:
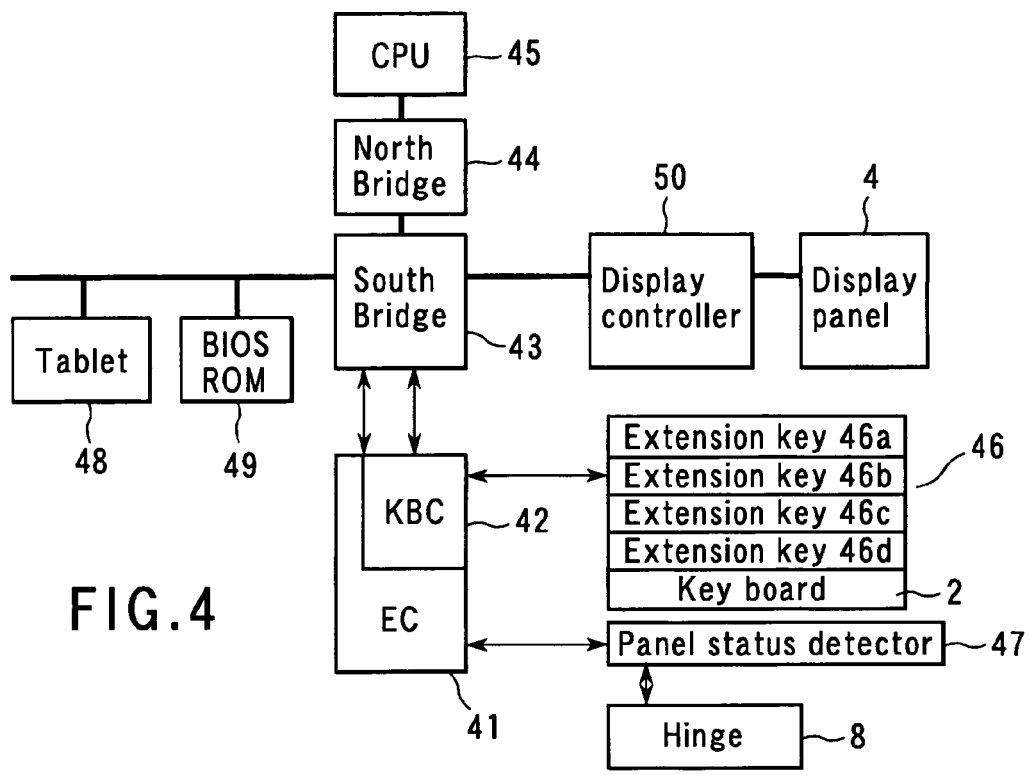
FIG. 4 is a block diagram showing a system configuration of the notebook computer according to the invention.

A state where the notebook computer 1 is used in the folded state is referred to as a utilization state in a tablet mode, and a state where the display unit is used in an opened state as usual is referred to as a utilization state in a note mode. FIG. 2 is a perspective view showing the utilization form in the note mode, where the keyboard 2 is used mainly as input means in a state where the display unit 5 is opened and stood with respect to the main body 7. On the other hand, FIG. 3 is a perspective view showing the utilization form in the tablet mode, where the display unit is used in a state where the display unit is folded and fixed on the main body 7. In other words, it is the state where the display unit 5 is turned over and the display panel 4 is exposed to be placed and fixed on the main body 7.

The characteristics of the present embodiment which allows the two types of utilization forms described above resides in that the function of a specific key button or the display contents displayed on the display panel is changed according to the respective utilization forms. Constituents for explaining the characteristics will be described below.

In the notebook computer 1 according to the present embodiment, scanned data according to the pressing of each key in the keyboard 2 provided on the main body 7 is transmitted and the scanned data is transmitted to a keyboard controller (KBC) 42 provided in an embedded controller (EC) 41. The KBC 42 converts the scanned data received from the keyboard 2 into a key code corresponding to each scanned data and outputs it to a south bridge 43 which is an I/O controller. The south bridge 43 interprets this key code and converts it into command data, and causes various control commands to be performed, for example, by transmitting the data to a CPU 45 via a north bridge 44.

Figure 5:
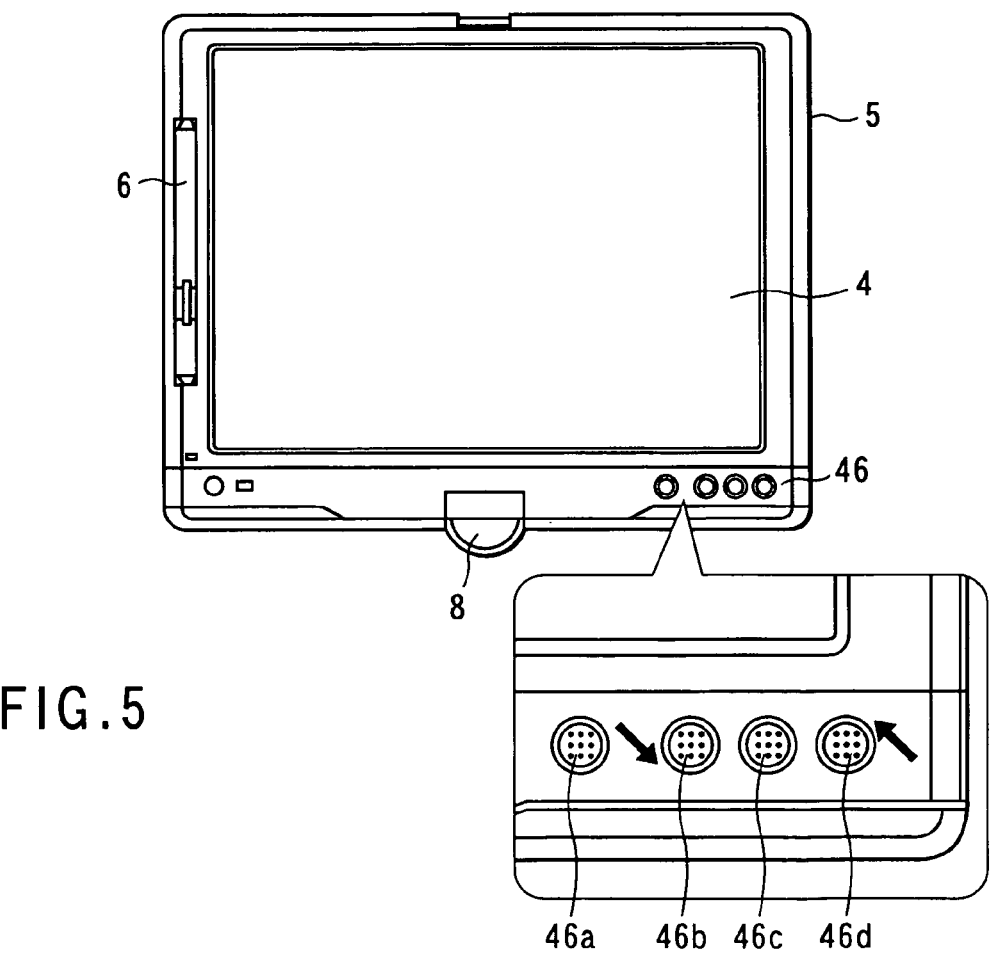
FIG. 5 is an appearance view of a display unit of the notebook computer according to the embodiment.

Further, the KBC 42 receives data by the key pressing of an extension key 46 in addition to each key provided on the keyboard 2. The extension key 46 includes four keys provided in the display unit 5, which are provided at a lower right portion of the display panel 4 in the display unit as shown in FIG. 5. An output code output from the extension key 46 is processed as an extension code of the key code of the KBC 42. The code of this extension code is changeable according to a command. A command for changing the extension code is output on the basis of a detection result output from a panel status detector 47 or the like. The panel status detector 47 detects a rotation state of the hinge 8 connecting the display unit 5 and the main body 7, and detects whether the notebook computer 1 is in the note mode or in the tablet mode. Specifically, as shown in FIG. 6, the panel status detector 47 determines a mode according to two rotation operations of a right/left rotation state (0° to 180°) and an open/shut state (open or shut) of the display unit 5. For example, when the display panel is rotated by 180° and is in the shut state, the panel status detector 47 determines this state as the tablet mode, and determines other state as the note mode. The state where the display panel is rotated by 180° and is in the shut state is the state shown in FIG. 3. In the case where the panel is rotated from 0° to 180° or its state is changed from open or shut entirely, the panel status detector 47 detects the change so that the current mode is maintained at the transition from 0° to 180° and from open to shut. When the panel status detector 47 detects a change in the rotation state of the display unit, an SMI interruption (System Management Interrupt) is generated, so that the state change is notified to a BIOS program.

A tablet 48 detects a contact position by a pen and outputs coordinate data. The tablet 48 is a coordinate detector on a transparent sheet, and is placed and arranged on the display panel. Thereby, a user is allowed to input by a pen directly while viewing the display contents on the display panel 4. An electrostatic capacity system or the like is used for the coordinate detection system, and a capacitance change through a pen contact is detected and the coordinate is detected in the electrostatic capacity system. A BIOS-ROM 49 is a rewritable non-volatile flash memory storing the BIOS program for driving the notebook computer 1 therein. The BIOS program stored in the BIOS-ROM 49 is read out and executed by the CPU 45 after the notebook computer 1 starts. A password registered by a user is recorded in the BIOS-ROM 49, and the password is used for password check when the computer starts. Further, a setup program for operation setting of the notebook computer or a boot selection setting program for boot device change is stored in the BIOS-ROM 49, and these setting programs are read out and executed by an instruction from the keyboard 2 or the extension key 46 when the computer starts.

A display controller 50 is a display control device for controlling display data displayed on the display panel 4, and generates the display data on the basis of an instruction from the CPU 45 or the like. When the operation form of the notebook computer 1 is the tablet mode, the display controller 50 generates and displays in an outputting manner the display data in a display direction previously set in the BIOS-ROM 49. Specifically, four display forms are possible in the tablet mode as shown in FIGS. 7A to 7D. When a position of the hinge 8 or the extension key 46 is based, the display data in the display as shown in FIG. 7A (vertical/right), in the display as shown in FIG. 7B (vertical/left), in the display as shown in FIG. 7C (horizontal/bottom), and in the display as shown in FIG. 7D (horizontal/top) are generated. A display direction in an initial state in the tablet mode is a display direction as shown in FIG. 7A (vertical/right), and the display direction is changed by the display controller 50 to be displayed in an outputting manner when the user changes the setting or executes a specific program.

Next, the functions of four extension keys 46 provided in the display unit will be described. The extension key 46 comprises four keys 46a to 46d. The extension keys 46a and 46c are allocated as a function button, and a specific function can be directly performed with these keys pressed. The allocated functions of these keys are changed according to the operation state of the notebook computer 1.

Specifically, either "reset function" or "setup screen display function" is allocated to the extension key 46a.

The "reset function" is a function for temporarily shutting down from a state where an OS of the computer is being driven and performing restart. In the utilization form of the note mode, reset can be performed by simultaneously pressing three keys of "Ctl", "Alt", and "Del" in the keyboard 2. On the other hand, since the keyboard 2 cannot be used in the utilization form of the tablet mode, the extension key 46a to which the reset function is allocated as a function during OS running is prepared so as to perform reset while utilized in the tablet mode.

The "setup screen display function" is a function for starting a program capable of changing the setting of the notebook computer, and a function which can be performed by turning on a power supply and pressing a function key (for example, F1 key) provided in the keyboard during a boot processing in the utilization form of the note mode. On the other hand, since the keyboard 2 cannot be used in the utilization form of the tablet mode, the setup screen display function is allocated to the extension key 46a during the boot processing in the tablet mode so as to display the setup screen during utilized in the tablet mode.

Next, one of the three functions of "Menu screen display", "Enter", and "boot selection screen display" is allocated to the extension key 46c according to the state.

The "Menu screen display" is a function performed after the OS starts, which is directed for displaying a menu screen for performing volume change or display device change. In the utilization form of the note mode, it is performed by function keys in the keyboard 2 (Fn key+F12 key) and the like, but, since the keyboard cannot be used in the tablet mode, the function is allocated to the extension key 46c.

The "boot selection screen display" is a setting screen for selectively changing a boot device of the notebook computer, which changes the boot device from a hard disk to a CD-ROM or the like, for example.

In the note mode, the boot selection screen can be displayed by pressing the function keys (Fn key+F2 key) in the keyboard during the boot processing, but, since the keyboard cannot be used in the tablet mode, this function is allocated to the extension key 46c. The "Enter" is a function similar to the Enter key in the keyboard and a definite key for performing a selected item. This is also allocated to the extension key 46a in order to support the Enter key in the tablet mode. The extension key 46c is initially allocated to the "Menu screen display" or the "boot selection screen display". After the Menu screen is displayed or the boot selection screen is selected, the Enter key is allocated to the extension key 46, so that the menu can be selected.

The functions of the extension keys 46a to 46d change according to the utilization state of the notebook computer 1 and the operation state thereof as described above, and the state of the function change will be described using FIG. 8.

FIG. 8 is a list of the function of each extension key 46a to 46d according to the utilization state, that is, note mode or tablet mode, and the operation state, that is, at boot or after OS starts in the notebook computer 1 according to the present embodiment.

At first, when the notebook computer 1 is in the note mode at boot, all the extension keys 46a to 46d are invalid. This is because the keyboard 2 can be used in the note mode so that various operations can be realized by the use of the keyboard 2. Further, this is directed for preventing malfunction caused by operating the extension keys 46a to 46d.

Next, when the notebook computer is in the note mode when the boot processing is terminated and the OS starts, the reset function is allocated to the extension key 46a. Further, a cursor function in an upward direction, the Menu screen display/Enter function, and a cursor function in a downward direction are allocated to the extension key 46b, the extension key 46c, and the extension key 46d, respectively.

On the other hand, a case where the notebook computer 1 is in the tablet mode will be described. The extension keys 46a and 46c have the same function as a whole in the tablet mode. In other words, when the boot processing is performed in the tablet mode, the extension key 46a is a key for the setup screen display. Specifically, the setup screen for system setting change of the computer can be displayed when the power switch is turned on and the extension key 46a is pressed during the boot processing. Next, when the extension key 46c is pressed during the boot processing in the tablet mode, the boot selection screen is displayed. After the boot selection screen is displayed, the function thereof is changed to the function of the Enter key, so that an operation set and selected using the extension keys 46b, 46d, or the like can be determined and performed.

After the OS starts in the tablet mode, the reset function is allocated to the extension key 46a. In other words, the same function obtained by simultaneously pressing the Ctl key, the Alt key, and the Del key in the keyboard is allocated to the extension key 46a. The Menu screen display function or the Enter function is allocated to the extension key 46c. The menu screen for setting change on the OS is displayed by the pressing of the extension key 46c. Further, after the menu screen is displayed, the Enter function is allocated to the extension key 46c so that the set and selected operation can be determined and performed.

On the other hand, in the tablet mode, the direction types as a cursor key of the extension keys 46b and 46d are changed according to the display state. In other words, a moving direction is changed by the pressing of the extension key 46b or 46c such that the cursor is moved in the directions corresponding to the respective four display directions as shown in FIGS. 7A to 7D.

Specifically, when the display direction is a direction of (vertical/right) as shown in FIG. 7A, the extension key 46b is a key for moving the cursor in the rightward (→) direction, and the extension key 46c is a key for moving the cursor in the leftward (-) direction.

When the display direction is a direction of (vertical/left) as shown in FIG. 7B, the extension key 46b is a key for moving the cursor in the leftward (-) direction, and the extension key 46c is a key for moving the cursor in the rightward (-) direction.

When the display direction is a direction of (horizontal/bottom) as shown in FIG. 7C, the extension key 46b is a key for moving the cursor in the upward (↑) direction, and the extension key 46c is a key for moving the cursor in the downward (⇓) direction.

When the display direction is a direction of (horizontal/top) as shown in FIG. 7D, the extension key 46b is a key for moving the cursor in the downward (J) direction, and the extension key 46c is a key for moving the cursor in the downward (⇓) direction.

In this manner, the moving direction of the cursor key is changed according to the display direction so that the cursor can be moved in the same direction as the actual display direction. In other words, when the display direction is the direction of (vertical/left) as shown in FIG. 7B, assuming that the directions of the extension keys 46b and the 46c are (-) and (→), respectively, the cursor is changed to actually move in the vertical direction with respect to the display direction so that operational disadvantages can be eliminated.

Next, a function change operation of the extension key 46 according to the utilization form of the notebook computer according to the present embodiment will be described using FIGS. 9 to 13.

Figure 9:
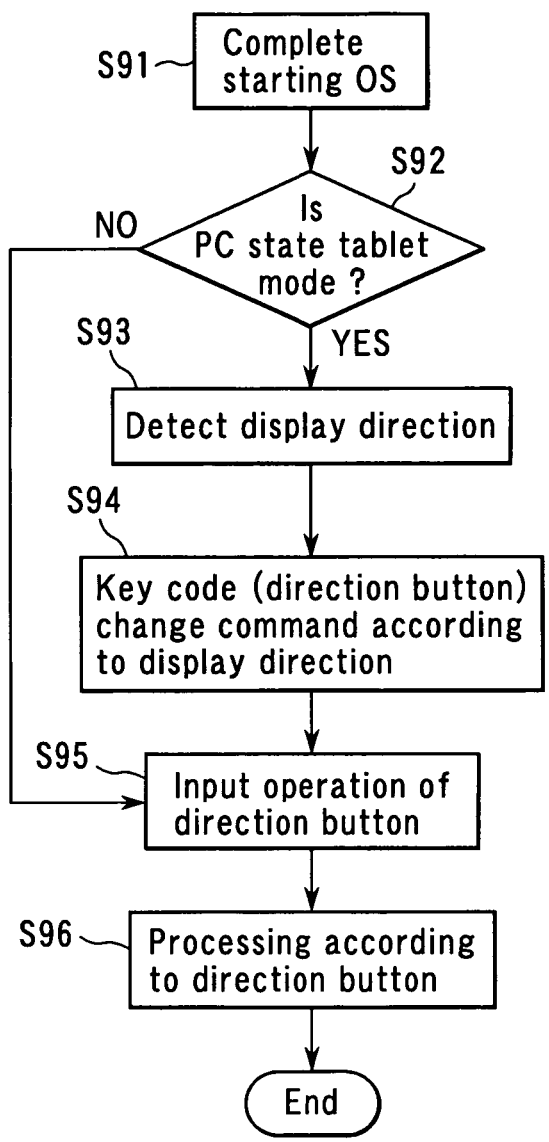
FIG. 9 is a flow chart showing an expansion key function change operation according to a display direction change in the tablet mode according to the embodiment.

FIG. 9 is a flow chart for explaining a function change of the extension keys 46b and 46d (direction keys) according to the display direction.

As shown in FIG. 9, after the boot processing is terminated and the starting of the OS is completed (step S91), the panel status detector 47 detects the utilization form of the notebook computer on the basis of the status of the hinge 8 (step S92). When the utilization form is in the tablet mode (Y in step S92), the panel status detector 47 notifies to the CPU 45 that the display form has been changed. The CPU 45 refers to the status of the display controller 50, and detects which direction among the four display directions as shown in FIGS. 7A to 7D the display direction is (step S93). In order to change the moving directions of the extension keys 46b and 46d in the directions in the list of FIG. 8 according to the detected display directions, the CPU 45 issues a key code change command for the KBC 42 to change the code of the scanned data of the extension keys 46b and 46d (step S94). When each extension key 46b, 46d is pressed after changed (step S95), the cursor is moved in the direction corresponding to the input of the extension key. Thereby, the cursor can be moved in the direction corresponding to the display direction.

Figure 10:
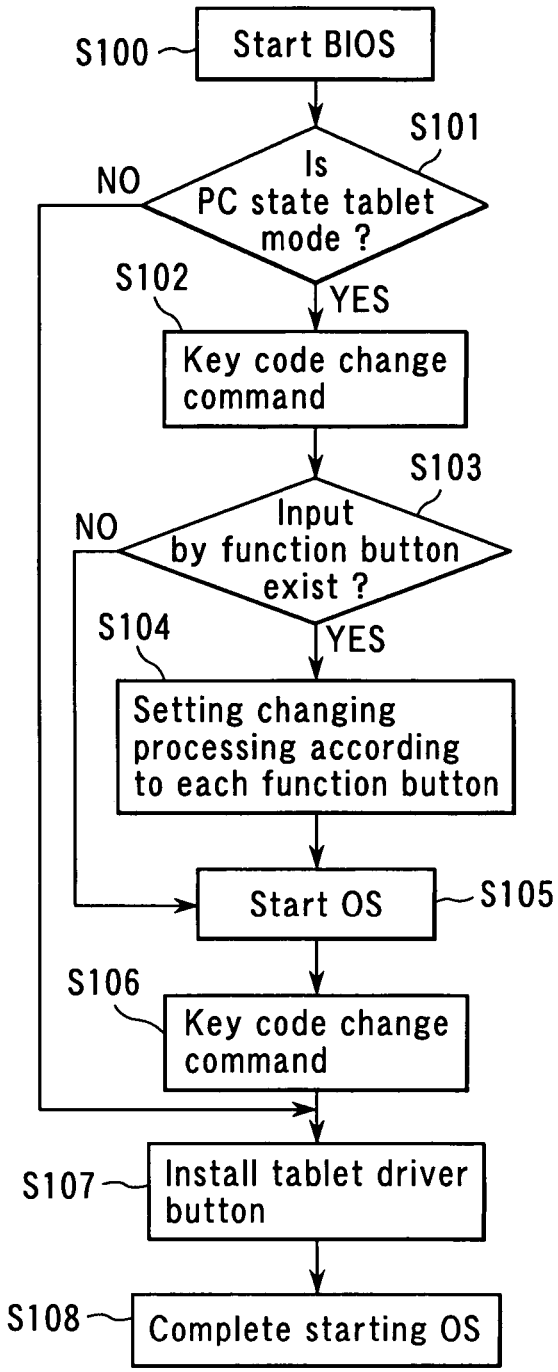
FIG. 10 is a flow chart for explaining a setting change processing operation by the extension key function change in the tablet mode according to the embodiment.

Next, FIG. 10 is a flow chart for explaining a function change operation of the extension keys 46a and 46c according to the utilization form of the notebook computer 1.

Figure 11:
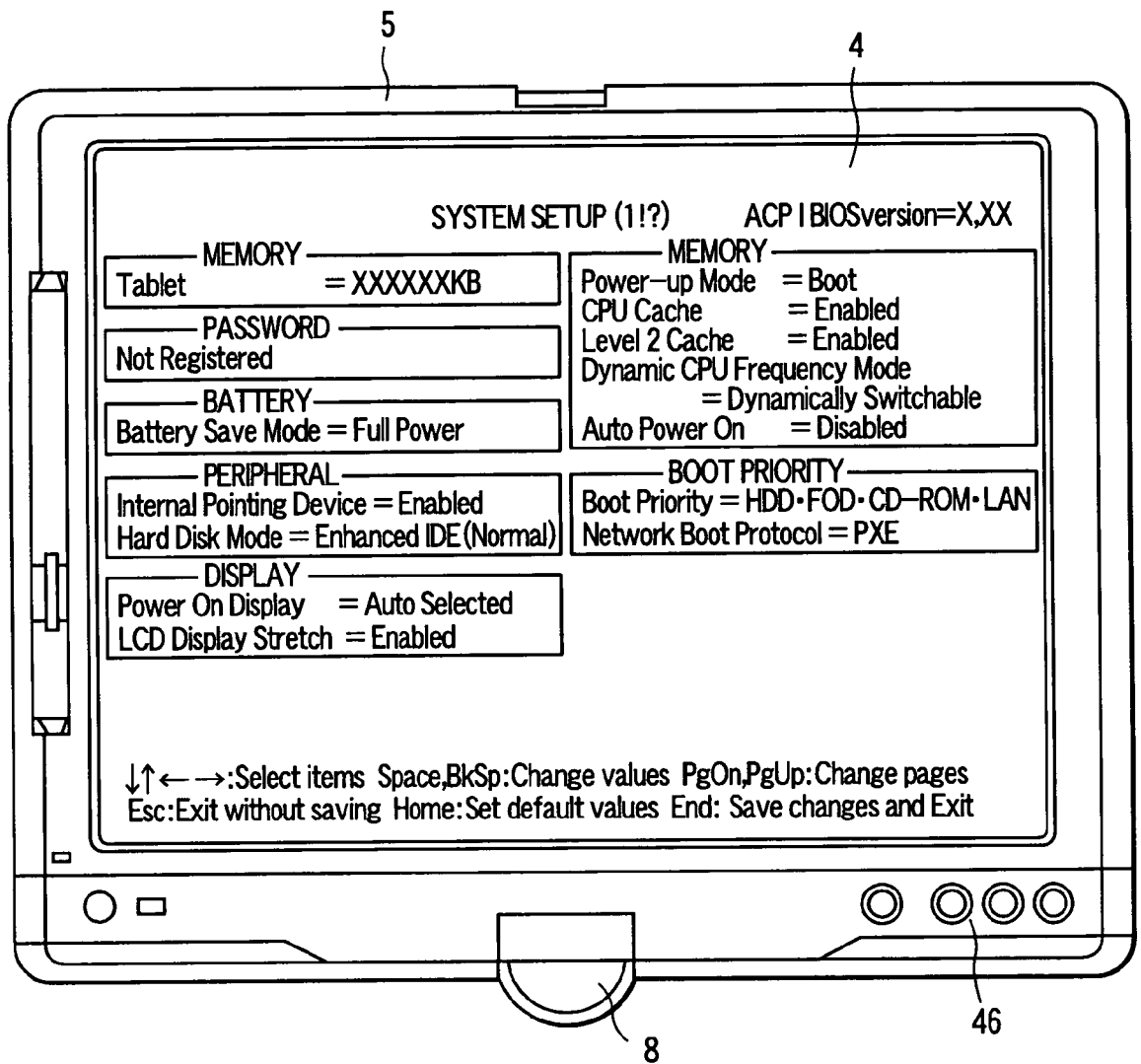
FIG. 11 is a diagram showing a state where a setup screen is displayed in the tablet mode according to the embodiment.

During BIOS running for the boot processing after the power is turned on, the panel status detector 47 detects whether the status of the notebook computer is in the tablet mode or in the note mode (step S101). When the detection result indicates the tablet mode, the CPU 45 outputs a key code change command for the KBC 42 (step S102). The KBC 42 changes the key code of the extension key 46. When either the extension key 46a or the extension key 46c is pressed during the boot processing (step S103), the KBC 42 displays the setting change screen corresponding to the pressed extension key. When the extension key 46a is pressed during the boot processing, for example, the setup screen is displayed on the display screen as shown in FIG. 11. Since the setup screen is displayed in the display direction (horizontal/bottom), the directions of the extension keys 46b and 46d are also changed according to the display direction. The user operates the extension keys 46b and 46d to select the setup item while viewing this setup screen, and determines and performs the selection by pressing the extension key 46c after the selection change. Thereby, the setting change is performed (step S104).

Next, when the boot processing is terminated and the OS starts (step S105), the CPU 45 issues a key code change command for the KBC 42 in order to return the key code to the mode after the OS starts (step S106). The KBC 42 changes to the key code after the OS stats as shown in FIG. 8. Then, after the key code change is completed, the CPU 45 performs an install processing of a tablet button driver (step S107) and completes the starting of the OS (step S108). In this manner, the key code is changed and the tablet button driver is installed before the starting of the OS is completed, so that losing of the function for utilizing the tablet button in a higher application on the OS can be prevented.

Figure 12:
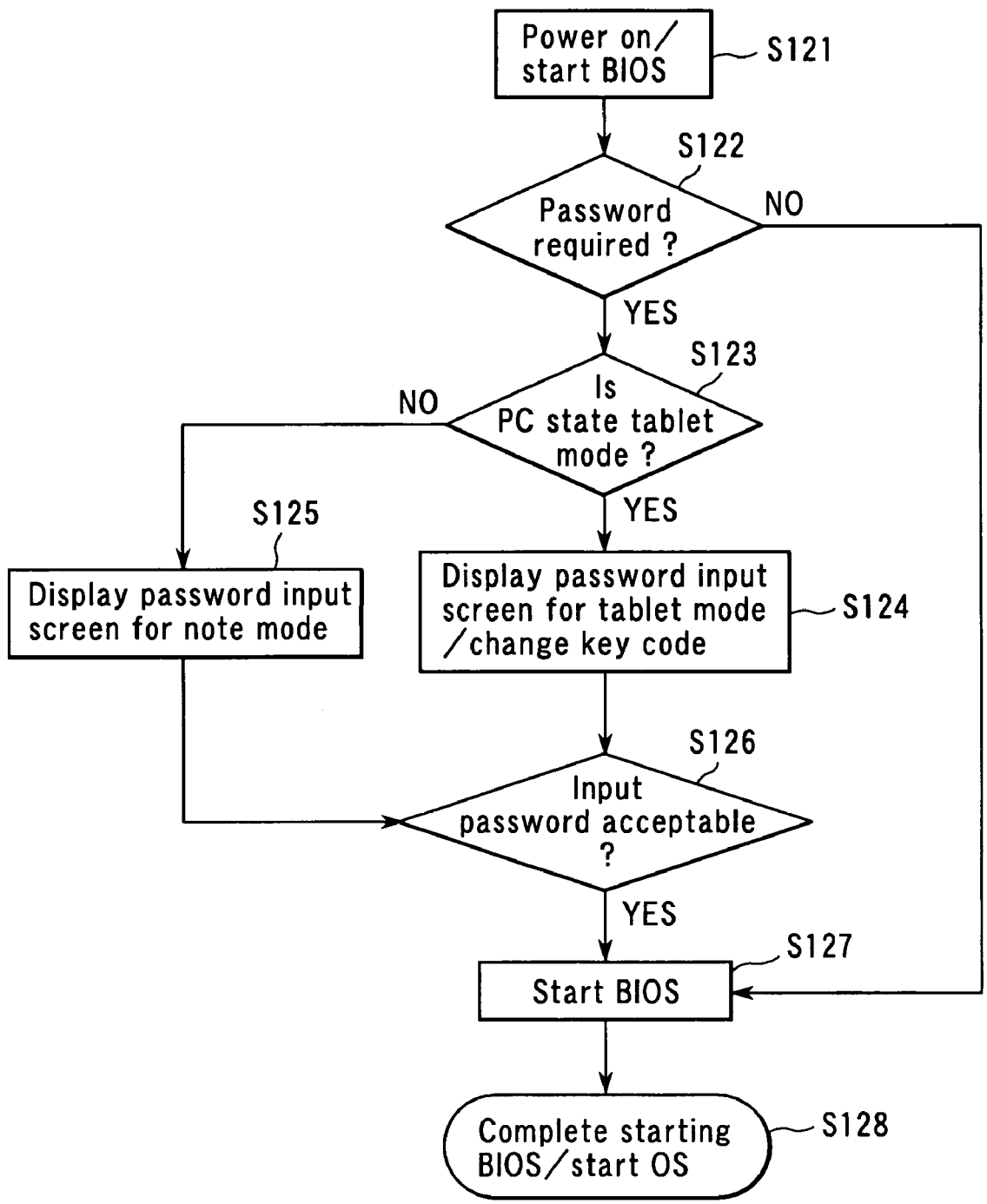
FIG. 12 is a flow chart for explaining a password input operation in the tablet mode according to the embodiment.

Next, FIG. 12 is a flow chart for explaining a password input operation in the tablet mode when the password is registered in the notebook computer 1.

When the password is registered in the notebook computer 1, it is generally required that the power is tuned on and the password is input before the boot processing. Since the keyboard 2 cannot be used in the tablet mode, a processing different from that in the note mode is required.

Figure 13:
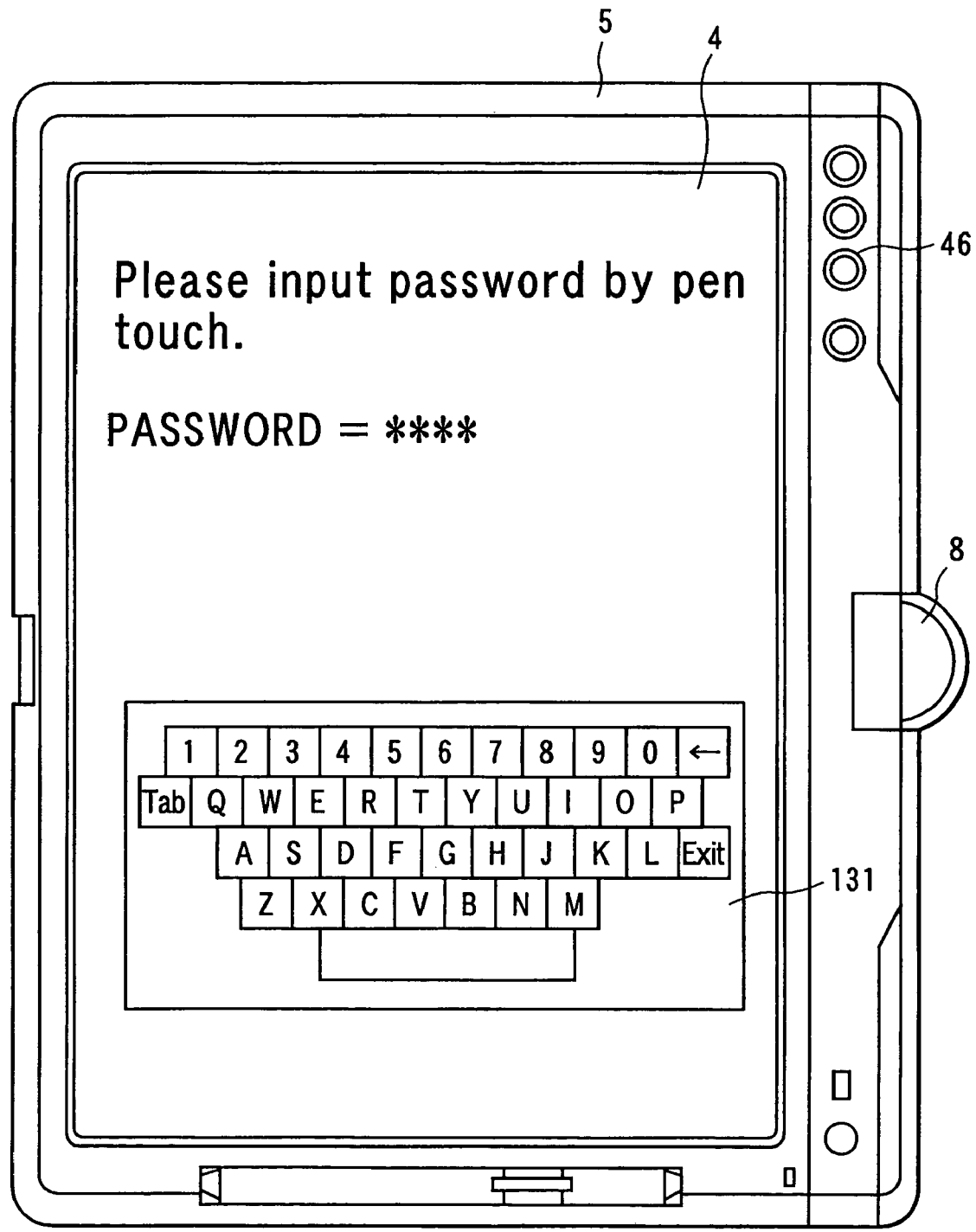
FIG. 13 is a diagram showing a display screen at a time of password input in the tablet mode according to the embodiment.

Specifically, when the BIOS starts after the power is turned on (step S121), the CPU 45 checks whether or not the password is registered in the notebook computer 1 (step S122). When the password is registered (Y in step S122), the CPU 45 refers to the detection result of the panel status detector 47 to determine whether the status of the notebook computer 1 is in the tablet mode or in the note mode (step S123). When the status of the notebook computer 1 is in the tablet mode (Y in step S123), a password input screen for tablet mode is displayed and the key code of the extension key 46 is changed (step S124). The password input screen for tablet mode is the screen as shown in FIG. 13, where the display direction of the notebook computer 1 is displayed in the direction of (vertical/right). The password can be input into the password input screen through pen input so that a keyboard screen 131 is simultaneously displayed. When the user touches a portion corresponding to a position of the key on the keyboard screen 131 through a pen, coordinate information corresponding to the position is transmitted from the tablet 48 and a key code corresponding to the position is issued. When the password input through pen input coincides with the password registered in the notebook computer 1 (step S126), the BIOS start processing is advanced to perform the boot processing (step S127), and the OS starts after the boot processing is performed (step S128). When the status of the notebook computer 1 is in the note mode, the password input screen for note mode is displayed as usual so that the password input is performed by the keyboard 2 (step S125).

As described above, according to the present embodiment, since the function of the extension key provided on the display unit side can be changed according to the operation mode in the notebook computer having two operation modes of the note mode and the tablet mode, various functions can be realized according to the state even with a small number of keys. Further, when display is performed in various display directions in the tablet mode, a direction to be pressed by an extension key can be changed according to the display direction so that the operability of the extension key can be improved.

It is possible to change the function of the key button provided on the display unit side according to the utilization form of the computer.

The present invention is not limited to the above embodiment, and can perform and obtain various modifications in a range which does not depart form the spirit in the embodiment. Further, the inventions in various stages are included in the above embodiment, and various inventions can be extracted by appropriate combinations in a plurality of disclosed configuration requirements.

Further, for example, even when some configuration requirements are deleted from all the configuration requirements disclosed in each embodiment, the object described in the section of "object that the present invention to solve" can be solved, and when the effect described in the section of "effect of the invention" can be obtained, a configuration where the configuration requirements are deleted can be extracted as the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalent.

What is claimed is:

1. An information processing device comprising:
   a main body having a keyboard;
   a display unit pivotally coupled between a first position and a second position, the display unit having a key button arranged on an outer surface of the display unit;
   a detector detecting whether the display unit is in a first position or in a second position; and
   means for changing functions of the key button according to a detection result of the detector; wherein the first position is a note mode where the display panel and the keyboard are arranged to face to each other, and the second position is a tablet mode where the display panel is exposed and the keyboard is hidden.

2. The information processing device according to claim 1, wherein the key buttons have at least direction keys for moving a cursor displayed on the display panel, and key codes issued according to the install status of the display unit are changed by the direction keys.

3. The information processing device according to claim 1, wherein the key buttons have at least function keys for performing a predetermined function, and key codes issued to the function keys are changed according to the install status of the display unit.

4. The information processing device according to claim 1, comprising means having a boot operation mode for performing a BIOS program and an operation mode after an OS starts, for changing functions allocated to the key buttons provided on the display unit.

5. An information processing device comprising:
   a main body having a keyboard;
   a display unit pivotally coupled between a first position and a second position, the display unit having a key button arranged on an outer surface of the display unit;
   a detector detecting whether the display unit is in a first position or in a second position; and
   means for changing functions of the key button according to a detection result of the detector,
   wherein the first position is a note mode where the display panel and the keyboard are arranged to face to each other, and the second position is a tablet mode where the display panel is exposed and the keyboard is hidden, and
   wherein, when the second position is the tablet mode, a screen for promoting password input is displayed on the display panel and a keyboard screen is displayed.

6. A button function allocating method of an information processing comprising a main body having a keyboard, and a display unit pivotally coupled between a first position and a second position, the display unit having a plurality of key buttons arranged on a outer surface of the display unit, comprising:
   detecting whether the display unit is in a first position or in a second position; and
   changing the functions of the plurality of key buttons according to a detected position; wherein the first position is in a note mode where the display panel and the keyboard are arranged to face to each other, and the second position is in a tablet mode where the display panel is exposed and the keyboard is hidden.

* * * * *

UNITED STATES PATENT AND TRADEMARK OFFICE
CERTIFICATE OF CORRECTION

PATENT NO. : 7,242,385 B2  
APPLICATION NO. : 10/700683  
DATED : July 10, 2007  
INVENTOR(S) : Kojo Page 1 of 1

It is certified that error appears in the above-identified patent and that said Letters Patent is hereby corrected as shown below:

Title page, Item (57), in the Abstract, line 3, change "having a buttons" to --having buttons--.

* Claim 6, column 10, line 12, change "a outer" to --an outer--.

Signed and Sealed this

Ninth Day of October, 2007

JON W. DUDAS  
*Director of the United States Patent and Trademark Office*